(12) United States Patent
Ha et al.

(10) Patent No.: US 7,569,257 B2
(45) Date of Patent: Aug. 4, 2009

(54) LIGHT MODULATING PLATE, BACKLIGHT ASSEMBLY HAVING THE SAME AND DISPLAY DEVICE HAVING THE SAME

(75) Inventors: Ju-Hwa Ha, Seoul (KR); Jin-Soo Kim, Seoul (KR); Heu-Gon Kim, Suwon-si (KR); Jae-Ho Jung, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 178 days.

(21) Appl. No.: 11/211,558

(22) Filed: Aug. 26, 2005

(65) Prior Publication Data

US 2006/0087865 A1 Apr. 27, 2006

(30) Foreign Application Priority Data

| Oct. 26, 2004 | (KR) | ...................... 10-2004-0085747 |
| Oct. 26, 2004 | (KR) | ...................... 10-2004-0085750 |
| Oct. 27, 2004 | (KR) | ...................... 10-2004-0086361 |

(51) Int. Cl.
*C09K 19/00* (2006.01)
(52) U.S. Cl. .......................... 428/1.1; 362/607; 349/64; 385/901; 359/452; 359/599
(58) Field of Classification Search .................. 349/64, 349/65, 96, 112, 61–63; 428/304.4–319.9, 428/1.1; 362/607, 610, 616, 600, 19, 29, 362/30, 606, 618, 619, 627, 629, 97, 561, 362/330, 559; 427/162, 163.1, 243, 407.1; 385/901, 1, 2, 14, 125, 129–132, 146; 359/452, 359/599

See application file for complete search history.

(56) References Cited

U.S. PATENT DOCUMENTS

| 5,138,472 | A * | 8/1992 | Jones et al. .................. 349/166 |
| 2003/0053008 | A1* | 3/2003 | Nakano ....................... 349/65 |
| 2003/0118807 | A1* | 6/2003 | Laney et al. ............. 428/315.5 |
| 2004/0022050 | A1* | 2/2004 | Yamashita et al. ............ 362/31 |
| 2004/0042233 | A1* | 3/2004 | Suzuki et al. ................ 362/561 |
| 2005/0053729 | A1* | 3/2005 | Bourdelais et al. ........... 428/1.1 |
| 2006/0055918 | A1* | 3/2006 | Groess et al. ............. 356/239.2 |

FOREIGN PATENT DOCUMENTS

JP 2002-182200 6/2002

OTHER PUBLICATIONS

English Abstract, Publication No. JP 2002-182200.

* cited by examiner

*Primary Examiner*—Anabel Ton
*Assistant Examiner*—Kevin Spinella
(74) *Attorney, Agent, or Firm*—Haynes and Boone, LLP (57) ABSTRACT

In a light modulating plate, a backlight assembly having the light modulating plate and a display device having the light modulating plate, the light modulating plate includes a light modulating layer and a light characteristics improving member. The light modulating layer includes a foam layer to modulate a light. The light characteristics improving member is integrally formed with the light modulating layer to improve optical characteristics of the light that has passed through the light modulating layer. Therefore, the backlight assembly is easily fabricated, and an image display quality is improved.

18 Claims, 11 Drawing Sheets

LIGHT MODULATING PLATE, BACKLIGHT ASSEMBLY HAVING THE SAME AND DISPLAY DEVICE HAVING THE SAME

CROSS-REFERENCE TO RELATED APPLICATIONS

The present application claims priority from Korean Patent Application No. 2004-86361, filed on Oct. 27, 2004, Korean Patent Application No. 2004-85747, filed on Oct. 26, 2004, and Korean Patent Application No. 2004-85750, filed on Oct. 26, 2004, the disclosure of which is hereby incorporated herein by reference in their entireties.

BACKGROUND OF THE INVENTION

1. Field of the Invention

The present invention relates to a light modulating plate, and a backlight assembly and a display device having the light modulating plate. More particularly, the present invention relates to a light modulating plate capable of being easily fabricated and exhibiting an improved image display quality, and a backlight assembly and a display device containing the light modulating plate.

2. Description of the Related Art

A liquid crystal display (LCD) device has various advantageous characteristics in thickness, durability, weight, power consumption, etc. The LCD device is a type of flat panel display device. The LCD device includes an LCD panel that has two substrates and a liquid crystal layer interposed between the substrates. In the LCD device, generally, liquid crystal of the liquid crystal layer varies arrangement thereof in response to an electric field applied thereto, and thus a light transmittance thereof is changed, thereby displaying an image.

The LCD device is a non-emissive type display device that includes a backlight assembly that supplies an LCD panel with light. The backlight assembly includes optical sheets such as a reflecting sheet, a diffusion plate, etc., and a lamp assembly generating the light. The optical sheets further include a diffusion sheet, a prism sheet, a reflective polarizing sheet, etc. However, when the number of the optical sheets and a size of each of the optical sheets are increased, a manufacturing process of the backlight assembly becomes complicated.

SUMMARY OF THE INVENTION

The present invention provides a light modulating plate capable of being easily fabricated and exhibiting an improved image display quality. The present invention also provides a backlight assembly and a display device adopting the above-mentioned light modulating plate.

A light modulating plate in accordance with an embodiment of the present invention includes a light modulating layer and a light characteristics improving member. The light modulating layer includes a foam layer to modulate a light. The light characteristics improving member is integrally formed with the light modulating layer to improve optical characteristics of the light that has passed through the light modulating layer.

A backlight assembly in accordance with an aspect of the present invention includes a lamp, a light modulating layer and a light characteristics improving member. The lamp generates light. The light modulating layer includes a foam layer to scatter the light to modulate the light generated from the lamp. The light characteristics improving member is integrally formed with the light modulating layer to improve optical charactetistics of the light that has passed through the light modulating layer.

A backlight assembly in accordance with another aspect of the present invention includes a lamp, a first foam layer, a diffusion layer, a second foam layer and a light characteristics improving layer. The lamp generates light. The first foam layer firstly scatters the light generated from the lamp. The diffusion layer is integrally formed with the first foam layer to diffuse the firstly scattered light. The second foam layer is integrally formed with the diffusion layer to secondly scatter the diffused light. The light characteristics improving layer is integrally formed with the second foam layer to improve optical characteristics of the secondly scattered light.

A backlight assembly in accordance with still another aspect of the present invention includes a lamp, a light guiding layer and a foam layer. The lamp generates light. The light guiding layer is adjacent to a side of the lamp to guide the light generated from the lamp. The foam layer is integrally formed with the light guiding layer to scatter the guided light. The light characteristics improving member is integrally formed with the foam layer to improve optical characteristics of the scattered light.

A display device in accordance with an exemplary embodiment of the present invention includes a display unit and a backlight assembly. The display unit displays an image. The backlight assembly includes a lamp, a light modulating layer and a light characteristics improving member. The lamp generates light. The light modulating layer has a foam layer to scatter the light generated from the lamp. The light modulating layer modulates the light generated from the lamp. The light characteristics improving member is integrally formed with the light modulating layer to improve optical characteristics of the light that has passed through the light modulating layer.

According to the present invention, the light characteristics improving member is integrally formed with the diffusion plate having the foam layer or the light guiding layer so that an impact resistance of the light modulating plate is improved. In addition, the backlight assembly is easily fabricated, and the light is diffused by the foam layer to uniformize a luminance of the light.

DESCRIPTION OF THE EMBODIMENTS

It should be understood that the exemplary embodiments of the present invention described below may be varied and modified in many different ways without departing from the inventive principles disclosed herein, and the scope of the present invention is therefore not limited to these particular following embodiments. Rather, these embodiments are provided so that this disclosure will be thorough and complete, and will fully convey the concept of the invention to those skilled in the art by way of example and not of limitation.

Figure 1:
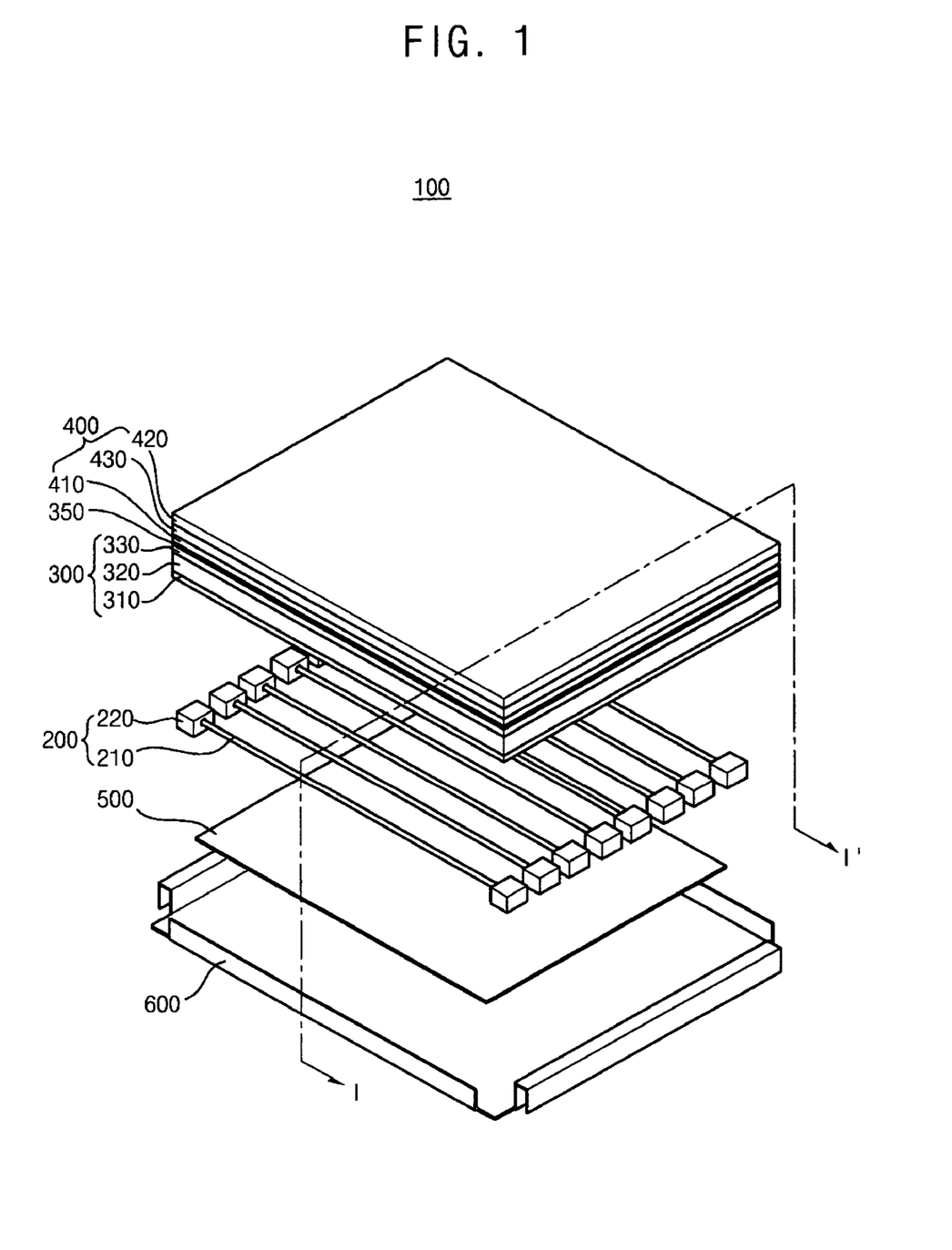
FIG. 1 is an exploded perspective view showing a backlight assembly in accordance with an embodiment of the present invention.
Figure 2:
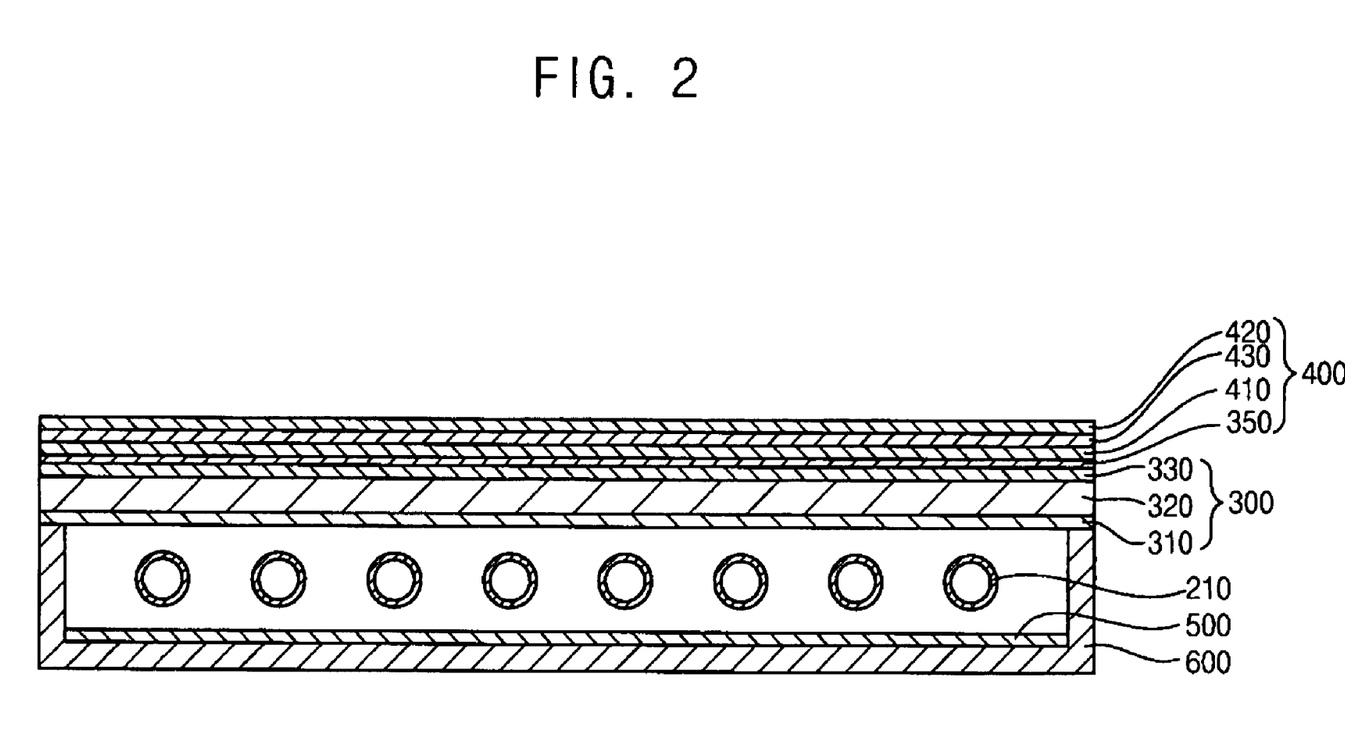
FIG. 2 is a cross-sectional view taken along a line I-I' shown in FIG. 1.

FIG. 1 is an exploded perspective view showing a backlight assembly in accordance with an exemplary embodiment of the present invention. FIG. 2 is a cross-sectional view taken along a line I-I' shown in FIG. 1. The backlight assembly 100 includes a lamp unit 200, a light modulating plate 300, a light characteristics improving member 400, a reflecting plate 500 and a receiving container 600. The lamp unit 200 includes a plurality of lamps 210 that are arranged substantially in parallel with one another, and a plurality of lamp holders 220 that fix the end portions of the lamps 210 to the receiving container 600.

The lamps 210 are cold cathode fluorescent lamps (CCFL) having an extended cylindrical shape. A hot electrode (not shown) and a cold electrode (not shown) are on the end portions of each lamp 210. A high voltage is applied to the hot electrode, and a low voltage is applied to the cold electrode, respectively. The lamp holder 220 covers the hot and cold electrodes of the lamps 210.

The light modulating layer 300 is arranged on the lamp unit 200 to diffuse the light generated from the lamp unit 200. In this embodiment, the light modulating plate is a diffusion plate 300 that has a multi-layered structure including a first foam layer 310, a diffusion layer 320 and a second foam layer 330.

Figure 3:
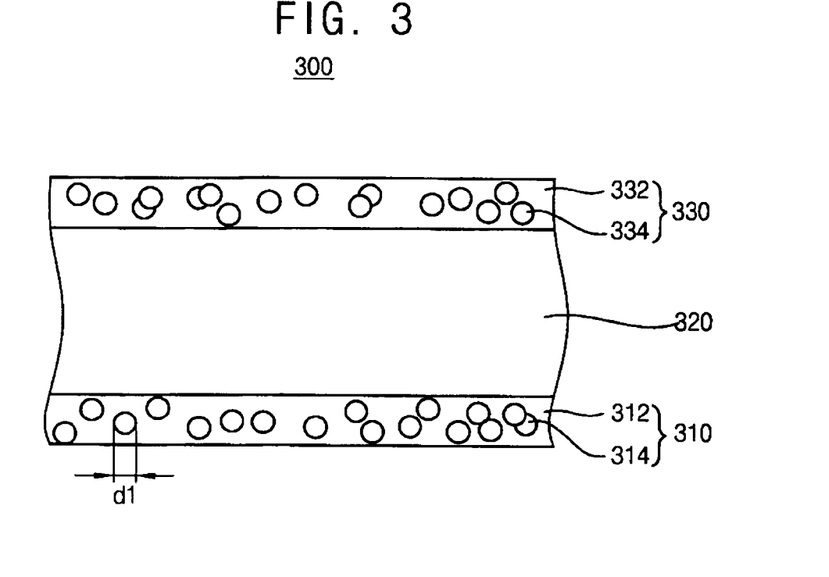
FIG. 3 is a cross-sectional view showing a light modulating layer of the backlight assembly shown in FIG. 1.

FIG. 3 is a cross-sectional view showing a light modulating layer of the backlight assembly shown in FIG. 1. The light modulating layer 300 includes the first foam layer 310, the diffusion layer 320 and the second foam layer 330. The light generated from the lamps 210 is initially scattered by the first foam layer 310. The diffusion layer 320 is arranged on the first foam layer 310 and diffuses the scattered light by the first foam layer 310. The second foam layer 330 is arranged on the diffusion layer 320 and scatters the diffused light from the diffusion layer 320 once again.

The diffusion layer 320 includes acrylic resin, a diffusing agent, etc. In this exemplary embodiment, the acrylic resin comprises polymethylmethacrylate (PMMA) that is prepared using methylmethacrylate (MMA) monomer. The first foam layer 310 includes a first mixture 312 and a plurality of first air bubbles 314 that are scattered in the first mixture 312. The first air bubbles 314 have various sizes, and their first diameter d1 may be no more than about 50 µm. The first mixture 312 includes an antistatic agent and acrylic resin. The first air bubbles 314 are formed by a foaming agent. The foaming agent is vaporized at a predetermined temperature to form the first air bubbles 314. That is, the first foam layer 310 includes the antistatic agent, the acrylic resin and the foaming agent. The antistatic agent dissipates an electric charge formed between a protecting film (not shown) and the diffusion plate 300 to protect the diffusion plate 300.

The second foam layer 330 includes a second mixture 332 and a plurality of second air bubbles 334 that are scattered in the second mixture 332. The second air bubbles 334 have various sizes, and a maximum size is no more than about 50 µm. Thus, the second air bubbles 334 have a substantially same size as the first air bubbles 314. The second mixture 332 includes an antistatic agent and acrylic resin. The second air bubbles 334 are formed by a foaming agent. Thus, the second foam layer 330 includes the antistatic agent, the acrylic resin and the foaming agent.

The light generated from the lamps 210 passes through the first and second air bubbles 314 and 334 and is scattered by the first and second air bubbles 314 and 334. Also, the light is diffused by the diffusion layer 320 to uniformize the luminance of the light. Although an amount of the diffusing agent is decreased, the light is scattered by the first and second foam layers 310 and 330, such that the luminance of the light is uniformized.

Furthermore, the sizes of the first air bubbles 314 and the second air bubbles 334 are optimized to reduce the thickness of the diffusion plate 300. For example, in the case that the sizes of the first and second air bubbles 314 and 334 are decreased, the number of the first and second air bubbles 314 and 334 is increased. When the number of the first and second bubbles 314 and 334 is increased, an amount of the diffusion is increased, thereby uniformizing the luminance. The luminance of the diffusion plate 300 having the first and second foam layers 310 and 330 is more uniform than that of a diffusion plate without any foam layer. Also, the diffusion plate 300 having the first and second foam layers 310 and 330 may have a smaller thickness than the diffusion plate without any foam layer. The diffusion plate 300 may be formed through an injection molding process, an extrusion molding process, etc.

Figure 4:
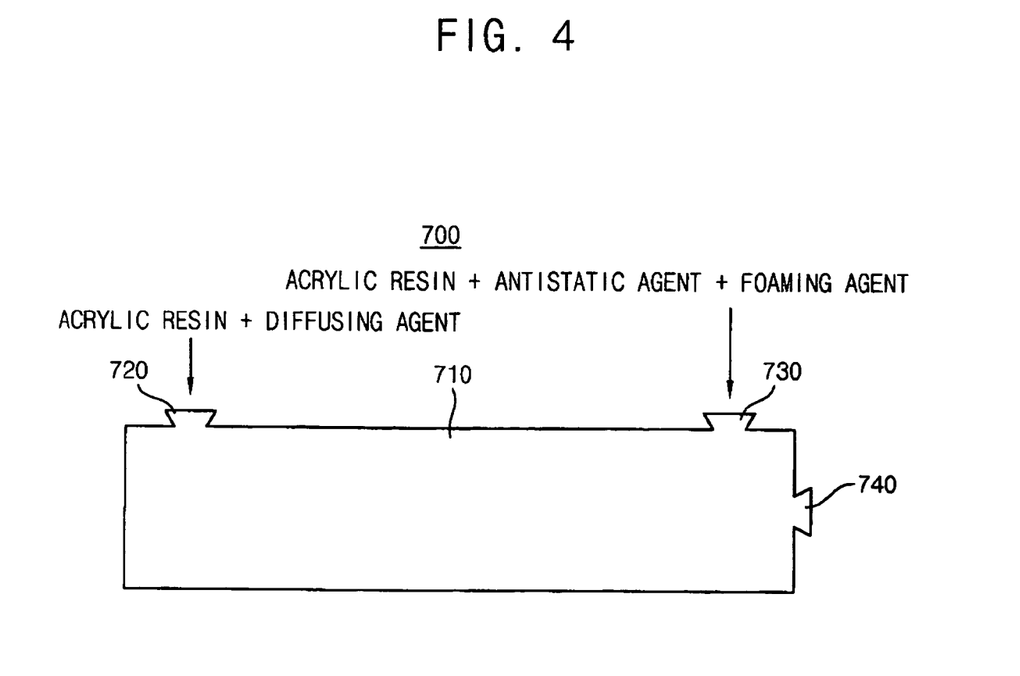
FIG. 4 is a cross-sectional view showing an apparatus for manufacturing a diffusion plate shown in FIG. 1.

FIG. 4 is a cross-sectional view showing an apparatus for manufacturing a diffusion plate 300 shown in FIG. 1. A diffusion plate manufacturing apparatus 700 includes a main body 710, a first inlet 720, a second inlet 730 and an outlet 740. For example, the apparatus 700 for manufacturing the diffusion plate is an extruder that extrudes an injected material to form the diffusion plate having a predetermined shape.

The acrylic resin and the diffusing agent for forming the diffusion layer 320 of the diffusion plate 300 are injected into the main body 710 through the first inlet 720. The acrylic resin, the antistatic agent and the foaming agent for forming the first and second foam layers 310 and 330 are injected into the main body 710 through the second inlet 730. The main body 710 has a predetermined shape to form the diffusion plate 300 having a flat shape. The first inlet 720 is adjacent to an input end portion of the main body 710, and the second inlet 730 is adjacent to an output end portion of the main body 710.

In order to manufacture the diffusion plate, the acrylic resin and diffusing agent are injected into the main body 710 through the first inlet 720 to form the diffusion layer 320. The acrylic resin, antistatic agent and foaming agent are injected into the main body 710 through the second inlet 730, and the injected antistatic and foaming agents are attached to an upper surface and a lower surface of the diffusion layer 320 to form the first and second foam layers 310 and 330, respectively. The injected antistatic and foaming agents are divided by a splitter (not shown) that is in the main body 710. The divided antistatic and foaming agents are attached to the upper and lower surfaces of the diffusion layer 320 to form the first and second foam layers 310 and 330, respectively. The completed diffusion plate 300 is extruded through the outlet 740. The extruded diffusion plate 300 may be cooled.

Figure 5:
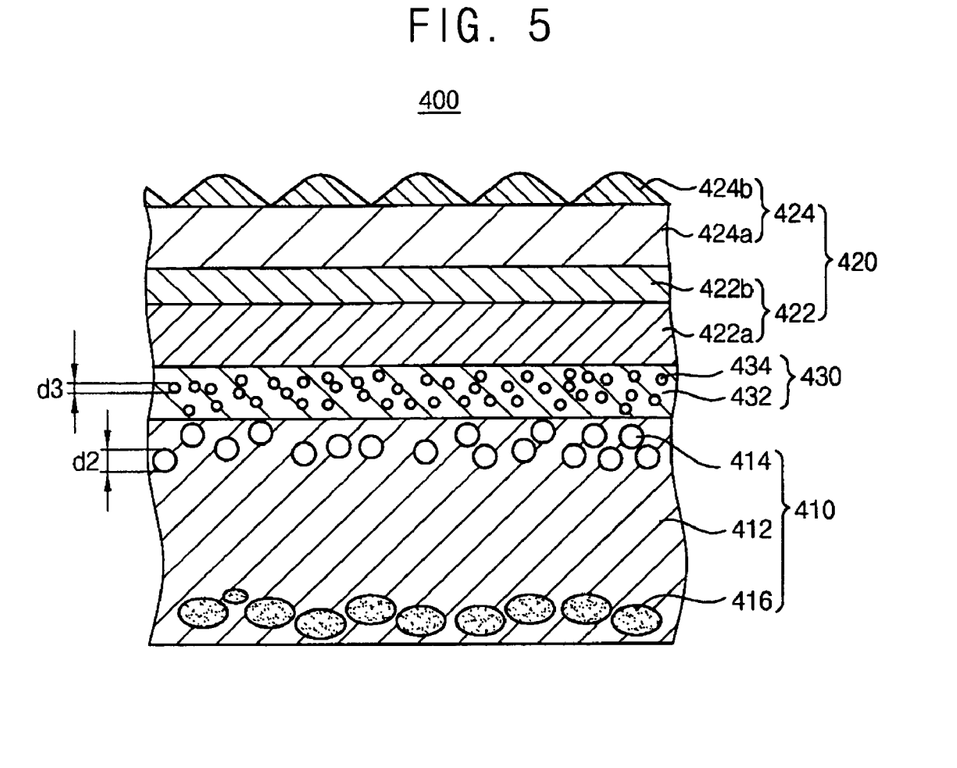
FIG. 5 is a cross-sectional view showing a light characteristics improving member of the backlight assembly shown in FIG. 1.

Referring again to FIGS. 1 and 2, the light characteristics improving member 400 is laminated on the diffusion plate 300. The light characteristics improving member 400 includes a diffusion sheet 410, an optical sheet and a first adhesive layer 430. FIG. 5 is a cross-sectional view showing the light characteristics improving member 400 of the backlight assembly shown in FIG. 1. The light characteristics improving member 400 includes the diffusion sheet 410, a prism sheet 420 and the first adhesive layer 430.

The diffusion sheet 410 includes a thermosetting resin layer 412, a plurality of third air bubbles 414 and a plurality of beads 416. The third air bubbles 414 and the beads 416 are in the thermosetting resin layer 412. The thermosetting resin layer 412 binds the beads 416, such that the beads 416 are fixed to the thermosetting resin layer 412. In an embodiment, the thermosetting resin 412 is heated to bind the beads 416. The third air bubbles 414 are arranged on an upper portion of the thermosetting resin layer 412. The third air bubbles 414 are formed by the foaming agent. The foaming agent is vaporized at a predetermined temperature to form the third air bubbles 414. The third air bubbles 414 have various sizes and their diameter d2 may be no more than about 50 μm. The light that has passed through the diffusion plate 300 is scattered by the third air bubbles 414.

The beads 416 are arranged on a lower portion of the thermosetting resin layer 412. The beads 416 have various sizes. A contact area between the diffusion sheet 410 and the diffusion plate 300 is decreased by the beads 416 to protect the diffusion plate 300. The diffusion sheet 410 may be formed through an injection molding process, an extrusion molding process, etc.

Figure 6:
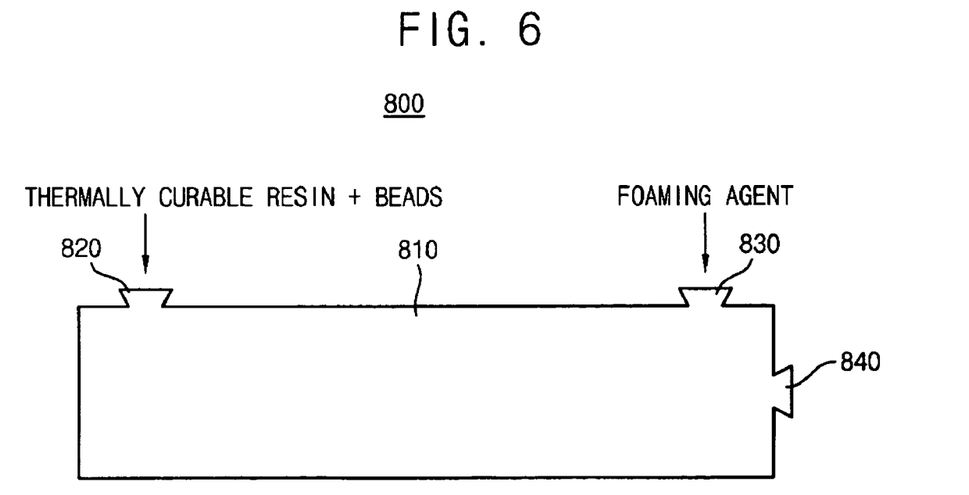
FIG. 6 is a cross-sectional view showing an apparatus for manufacturing a diffusion sheet shown in FIG. 5.

FIG. 6 is a cross-sectional view showing an apparatus for manufacturing the diffusion sheet shown in FIG. 5. The apparatus 800 for manufacturing the diffusion sheet includes a main body 810, a first inlet 820, a second inlet 830 and an outlet 840. In this embodiment, the apparatus 800 for manufacturing the diffusion sheet is an extruder that extrudes an injected material to form the diffusion plate having a predetermined shape.

The thermosetting resin and beads are injected into the main body 810 through the first inlet 820. The foaming agent for forming the third air bubbles 414 is injected into the main body 810 through the second inlet 830. The first inlet 820 is adjacent to an input end portion of the main body 810. The second inlet 830 is adjacent to the outlet 840 and an output end portion of the main body 810.

In order to manufacture the diffusion plate, the thermosetting resin and beads are injected into the main body 810 through the first inlet 820 to form the thermosetting resin layer 412. The beads 416 are arranged on the lower portion of the thermosetting resin layer 412 due to their weight. The foaming agent is injected into the main body 810 through the second inlet 830 to form the third air bubbles 414 on the upper portion of the thermosetting resin layer 412. The diffusion sheet 410 having the thermosetting resin layer 412, the third air bubbles 414 and the beads 416 is extruded through the outlet 840. The extruded diffusion sheet 410 may be cooled.

Referring to again FIG. 5, the prism sheet 420 includes a reflective polarizing sheet 422 and a brightness enhancement sheet 424, that is integrally formed with the reflective polarizing sheet 422. In this embodiment, the reflective polarizing sheet 422 is a double brightness enhancement film (DBEF), and the brightness enhancement sheet 424 is a rounded brightness enhancement film (RBEF).

The reflective polarizing sheet 422 includes a first base film 422a, and a reflective polarizing film 422b on the first base film 422a. The first base film 422a includes polycarbonate (PC). The brightness enhancement sheet 424 includes a second base film 424a that is integrally formed on the reflective polarizing film 422, and a plurality of prisms 424b that is formed on the second base film 424a. In this embodiment, the second base film 424a may also includes PC. Each of the prisms 424b may have a rounded corner. An acrylic resin is coated on the second base film 424a to form the prisms 424b.

The light that has passed through the diffusion sheet 410 is reflected and polarized by the reflective polarizing sheet 422. The light that has passed through the reflective polarizing sheet 422 is guided toward a viewer's side of the backlight assembly.

A first adhesive layer 430 is interposed between the diffusion sheet 410 and the prism sheet 420, such that the prism sheet 420 is laminated on an upper surface of the diffusion sheet 410. The first adhesive layer 430 includes a first adhesive agent 432 and a plurality of fourth air bubbles 434 that are randomly distributed in the first adhesive agent 432. The fourth air bubbles 434 are formed by a foaming agent and have a third diameter d3, which may be smaller than the first and second diameters d1 and d2.

The first adhesive layer 430 combines the diffusion sheet 410 and the prism sheet 420, and scatters the light that has passed through the diffusion sheet 410 by using the fourth air bubbles 434. According to this embodiment, the diffusion sheet 410 is integrally formed with the prism sheet 420 by the first adhesive layer 430 to improve an impact resistance of the backlight assembly. Therefore, a manufacturing process of the backlight assembly is simplified, and a manufacturing cost of the backlight assembly is decreased. In addition, the light is scattered by the fourth air bubbles 434 of the first adhesive layer 430 to uniformize luminance of the light.

Figure 7:
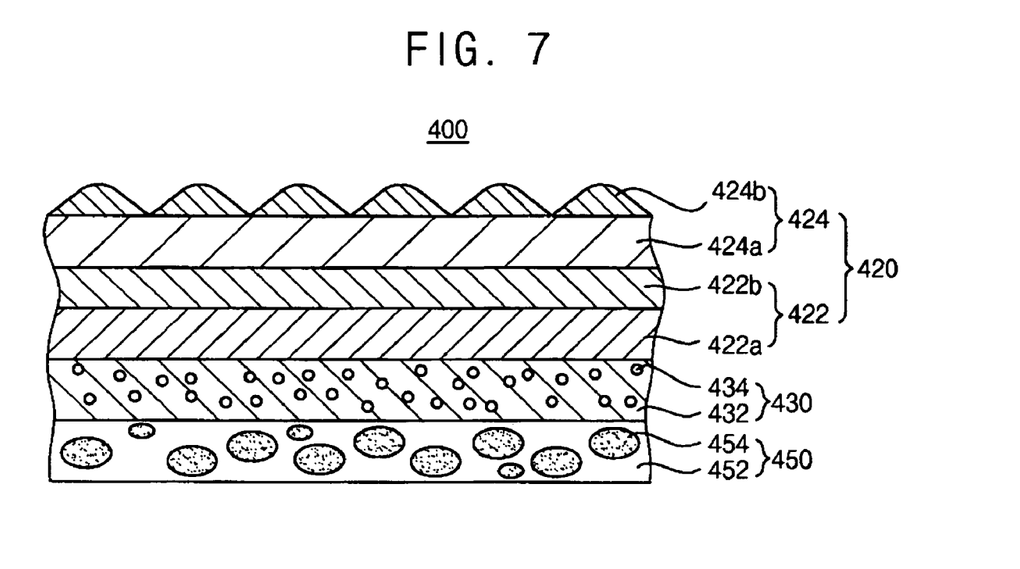
FIG. 7 is a cross-sectional view showing a light characteristics improving member in accordance with an embodiment of the present invention.

FIG. 7 is a cross-sectional view showing a light characteristics improving member in accordance with an embodiment of the present invention. The light characteristics improving member of FIG. 7 is the same as in FIG. 5 except for a diffusion sheet. Thus, the same reference numerals will be used to refer to the same or like parts as those described in FIG. 5 and any further explanation concerning the above elements will be omitted.

The light characteristics improving member 400 includes the diffusion sheet 450, a prism sheet 420 and a first adhesive layer 430. The diffusion sheet 450 includes a thermosetting resin layer 452 and a plurality of beads 454. The beads 454 are arranged in the thermosetting resin layer 452. The thermosetting resin layer 452 binds the beads 454, such that the beads 454 are fixed to the thermosetting resin layer 452. In this embodiment, the thermosetting resin layer 452 is heated to bind the beads 454. A diameter of the beads 454 is about 10 νm to about 50 νm.

Figure 8:
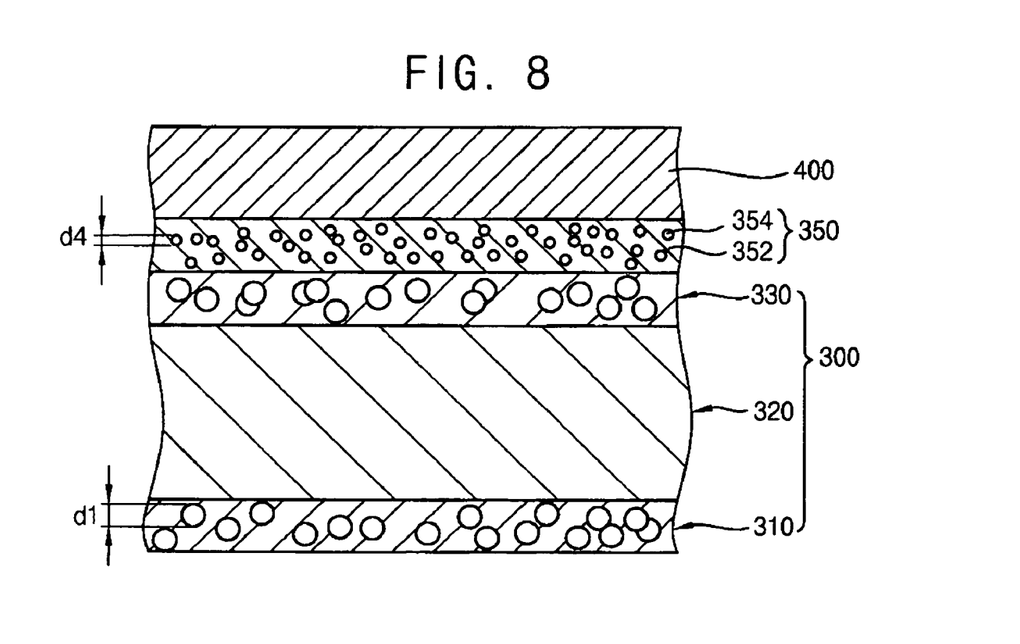
FIG. 8 is a cross-sectional view showing a second adhesive layer shown in FIG. 1.

Referring again to FIGS. 1 and 2, a second adhesive layer 350 is interposed between a diffusion plate 300 and the light characteristics improving member 400. The light characteristics improving member 400 is laminated on an upper surface of the diffusion plate 300 by the second adhesive layer 350. FIG. 8 is a cross-sectional view showing a second adhesive layer shown in FIG. 1.

Referring to FIGS. 7 and 8, the second adhesive layer 350 is interposed between the diffusion plate 300 and the light characteristics improving member 400, such that the light characteristics improving member 400 is integrally formed with the diffusion plate 300. The second adhesive layer 350 includes a second adhesive agent 352 and a plurality of fifth air bubbles 354 that are randomly distributed in the second adhesive agent 352. The fifth air bubbles 354 are formed by a foaming agent. A fourth diameter d4 of the fifth air bubbles 354 is smaller than the first diameter d1. In this embodiment, the fourth diameter d4 of the fifth air bubbles 354 may be substantially equal to the third diameter d3 of the third air bubbles 434.

The light characteristics improving member 400 is integrally formed with the diffusion plate 300 by the second adhesive agent 352. In addition, the light that has passed through the diffusion plate 300 is scattered by the fifth air bubbles 354 to uniformize luminance of the light. Therefore, an additional diffusion sheet may be omitted.

According to this exemplary embodiment, the light characteristics improving member 400 is integrally formed with the diffusion plate 300 by the second adhesive layer 350 to improve an impact resistance of the backlight assembly. Therefore, a manufacturing process of the backlight assembly is simplified, and a manufacturing cost of the backlight assembly is decreased. In addition, an air layer (not shown) between the diffusion plate 300 and the light characteristics improving member 400 is omitted so that the light may not be reflected from an upper surface or a lower surface of the air layer (not shown), thereby increasing a light transmittance of the diffusion plate 300 and the light characteristics improving member 400. When a refractive index between adjacent optical elements is one, a luminance when viewed from a plan view of the backlight assembly is maximized.

Figure 9:
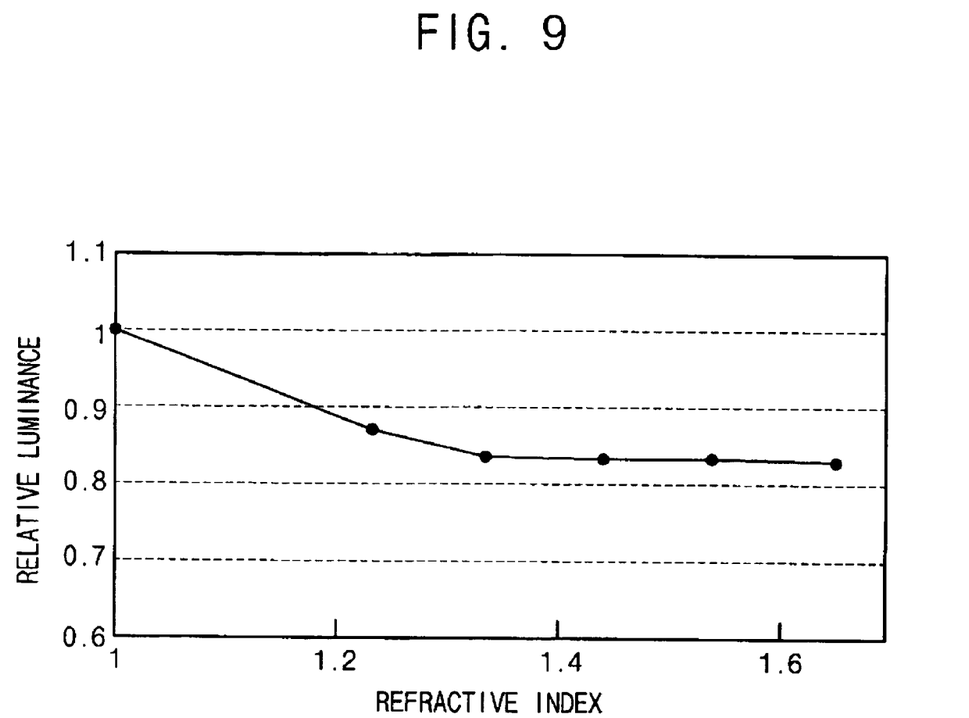
FIG. 9 is a graph showing a relationship between a relative luminance and a refractive index.

FIG. 9 is a graph showing a relationship between a relative luminance and a refractive index. Referring to FIGS. 8 and 9, when the refractive index between adjacent layers is 1, the relative luminance is maximized. When the refractive index between the adjacent layers is increased, the relative luminance is decreased. A refractive index of air is one. When the diffusion plate is integrally formed with the light characteristics improving member, the air layer is not formed between the diffusion plate and the light characteristics improving member. In this embodiment, a refractive index between the diffusion plate and the light characteristics improving member is no less than one, such that the refractive index ratio is no more than one.

According to this exemplary embodiment, the diffusion plate 300 has the first foam layer 310 having the first air bubbles 314 and the second foam layer 330 having the second air bubbles 334. The second adhesive layer 350 has the fifth air bubbles 354. In addition, the third air bubbles 414 are formed in the diffusion sheet 410 of the light characteristics improving member 400, and the fourth air bubbles 434 are formed in the first adhesive layer 430 through which the diffusion sheet is attached to the prism sheet 420. The backlight assembly 100 includes the first, second, third, fourth and fifth air bubbles 314, 334, 414, 434 and 354, such that that an additional air layer (not shown) between the diffusion plate 300 and the light characteristics improving member 400 may be omitted.

Furthermore, an additional air layer (not shown) between the diffusion sheet 410 and the prism sheet 420 may also be omitted. Therefore, the refractive index between the diffusion plate 300 and the light characteristics improving member 400 is substantially one, and the refractive index between the diffusion sheet 410 and the prism sheet 420 is substantially one, such that the relative luminance of the backlight assembly 100 is increased. That is, the relative luminance of the backlight assembly 100 is maximized.

Figure 10A:
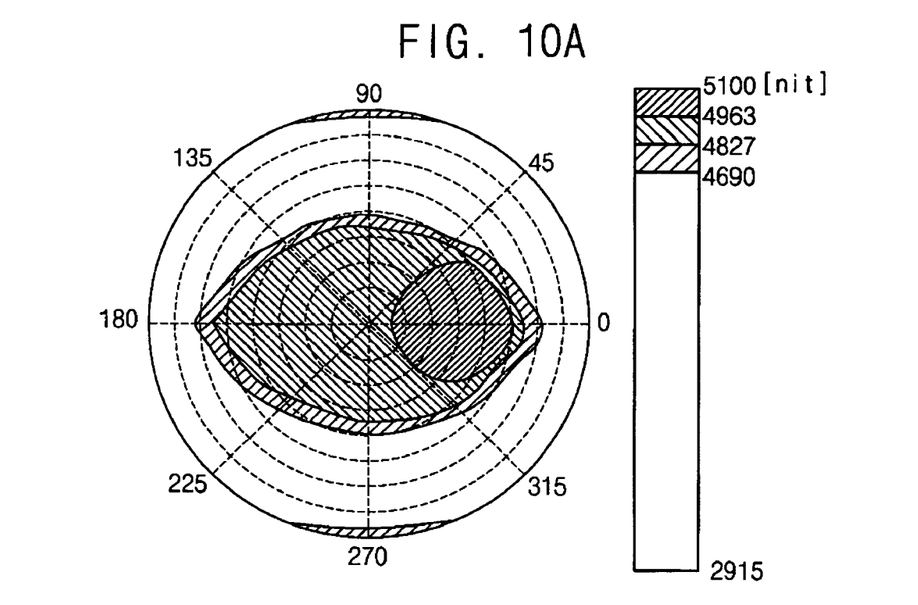
FIG. 10A is a graph showing a luminance when a light characteristics improving member is attached to a diffusion plate without air bubbles.
Figure 10B:
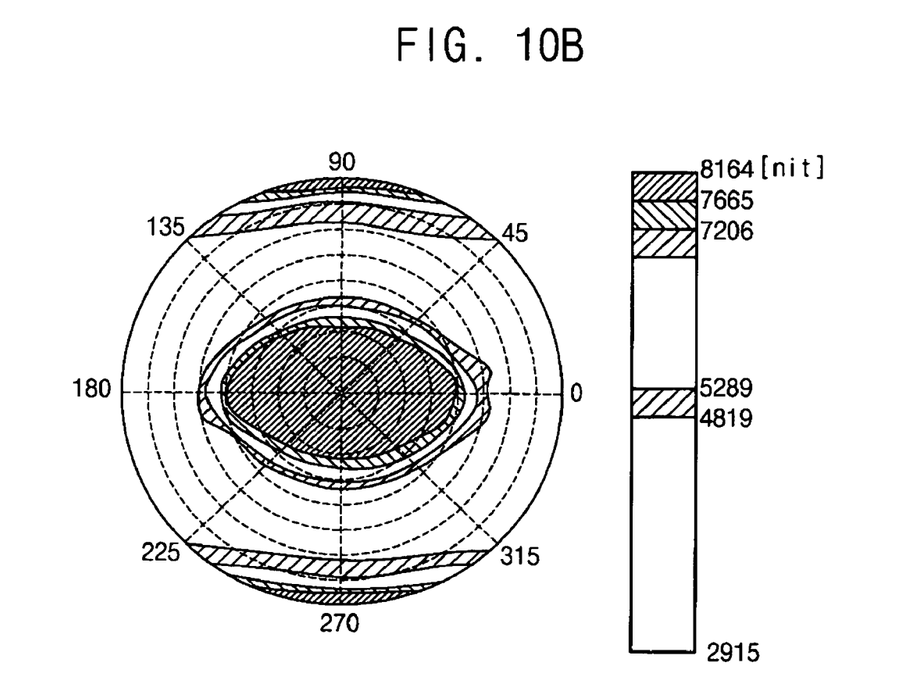
FIG. 10B is a graph showing a luminance when air bubbles are interposed between a light characteristics improving member and a diffusion plate.

FIG. 10A is a graph showing a luminance when a light characteristics improving member is attached to a diffusion plate without air bubbles. FIG. 10B is a graph showing a luminance when air bubbles are interposed between a light characteristics improving member and a diffusion plate. In this embodiment, the light characteristics improving member is a brightness enhancement sheet.

Referring to FIG. 10A, when the diffusion plate is integrally formed with the brightness enhancement sheet, the air bubbles are not formed between the diffusion plate and the brightness enhancement sheet, and a luminance when viewed from a plan view of the backlight assembly is about 5100 nit. Referring to FIG. 10B, when the air bubbles are interposed between the diffusion plate and the brightness enhancement sheet, a luminance when viewed from a plan view of the backlight assembly is about 8164 nit. Therefore, when the air bubbles are interposed between the diffusion plate and the brightness enhancement sheet, the luminance when viewed from the plan view of the backlight assembly is increased.

The backlight assembly includes the first, second, third, fourth and fifth air bubbles 314, 334, 414, 434 and 354 such that a luminance of the backlight assembly is increased, and the luminance when viewed from the plan view of the backlight assembly is also increased.

Referring again to FIGS. 1 and 2, a reflecting plate 500 is under the lamp unit 200, such that the light generated from the lamp unit 200 is reflected from the reflecting plate 500 toward the diffusion plate 300. The receiving container 600 is under the reflecting plate 500, and has a bottom plate and a plurality of sidewalls that are protruded from sides of the bottom plate to form a receiving space. The light characteristics improving member 400, the diffusion plate 300 and the lamp unit 200 are received in the receiving space.

Figure 11:
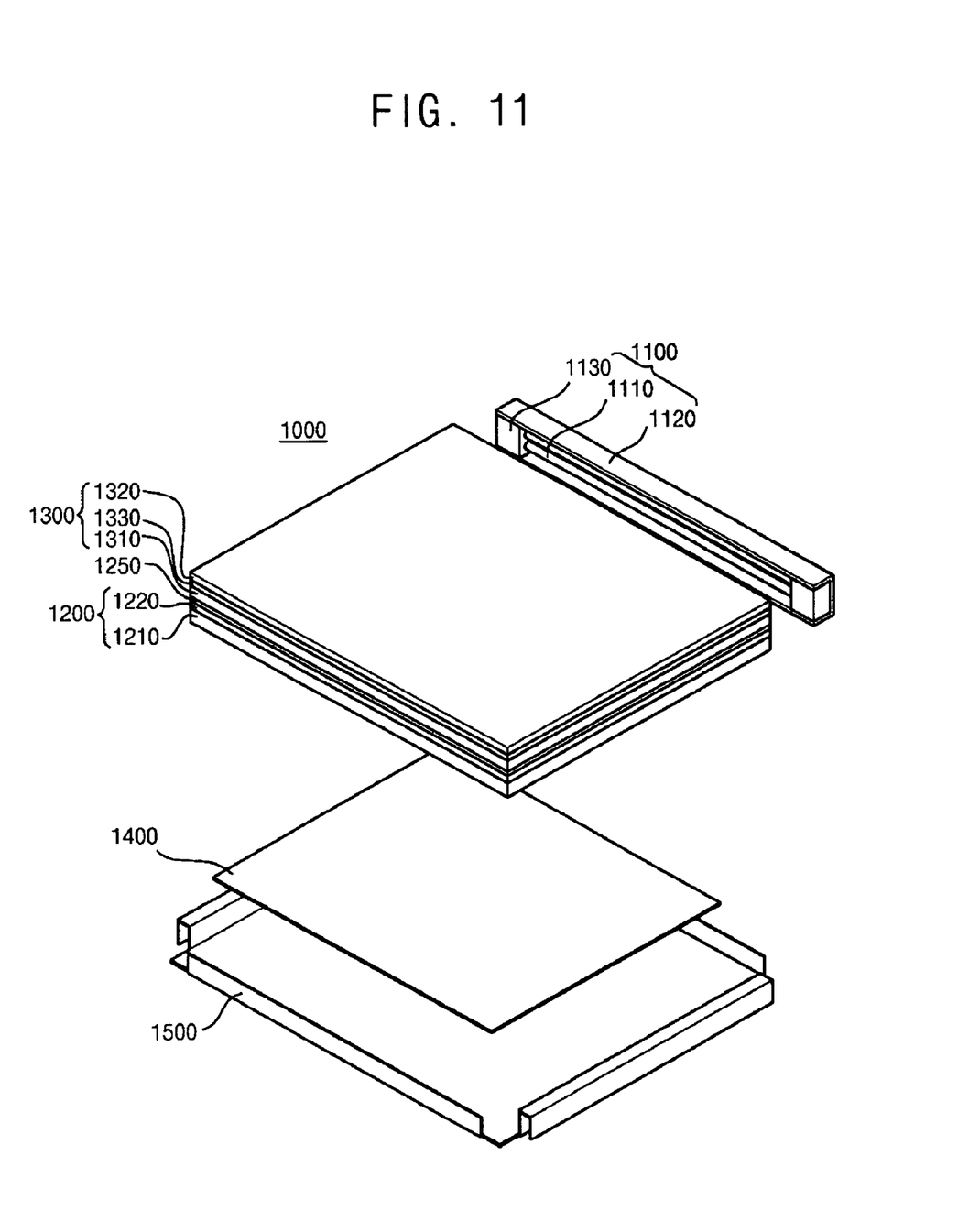
FIG. 11 is an exploded perspective view showing a backlight assembly in accordance with an embodiment of the present invention.

FIG. 11 is an exploded perspective view showing a backlight assembly in accordance with an embodiment of the present invention. The backlight assembly 1000 includes a lamp unit 1100, a light guiding plate 1200, a light characteristics improving member 1300, a reflecting plate 1400 and a receiving container 1500.

The lamp unit 1100 includes at least one lamp 1110 that generates light and a lamp cover 1120 that protects the lamp 1110. The light generated from the lamp 1110 is reflected from the lamp cover 1120 toward the light guiding plate 1200. The lamp unit 1100 is adjacent to a side of the light guiding plate 1200, and received in the receiving container 1500 adjacent to a side of the receiving container 1500. According to an embodiment of the present application, the lamp 1110 is a cold cathode fluorescent lamp (CCFL) having an extended cylindrical shape. A hot electrode (not shown) and a cold electrode (not shown) are on the end portions of the lamp 1110. A high voltage is applied to the hot electrode, and a low voltage is applied to the cold electrode, respectively. A lamp holder 1130 fixes the lamp 1110 to the lamp cover 1120.

The lamp cover 1120 may be formed of a reflective material. Alternatively, a reflective material may be coated on an inner surface of the lamp cover 1120. Therefore, the light generated from the lamp 1110 is reflected from the inner surface of the lamp cover 1120 toward the light guiding plate 1200. The light guiding plate 1200 is adjacent to the lamp unit 1100, and guides the light generated from the lamp unit 1100 into the light characteristics improving member 1300.

Figure 12:
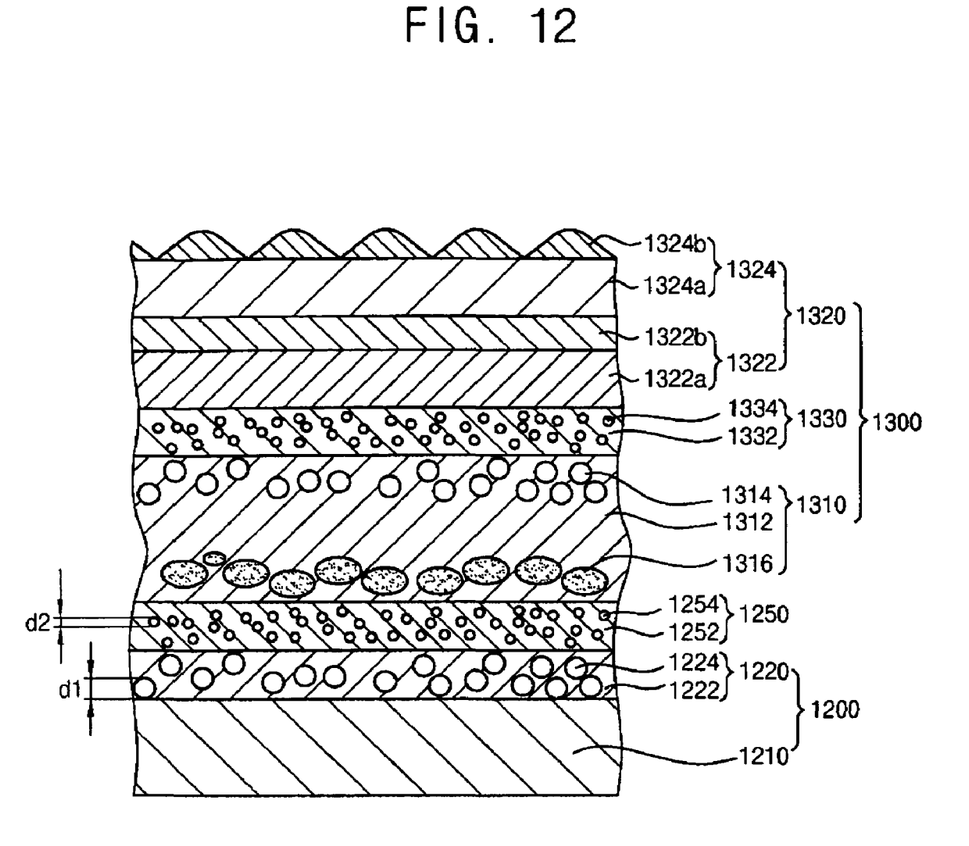
FIG. 12 is a cross-sectional view showing a light guiding plate and a light characteristics improving member of the backlight assembly shown in FIG. 11.

FIG. 12 is a cross-sectional view showing a light guiding plate and a light characteristics improving member of the backlight assembly shown in FIG. 11. Referring to FIGS. 11 and 12, the light guiding plate 1200 includes a light guiding layer 1210 and a foam layer 1220 on the light guiding layer 1210. The light guiding layer 1210 includes acrylic resin and a diffusing agent. A reflective pattern (not shown) may be formed under the light guiding layer 1210 so that the light generated from the lamp unit 1100 is reflected from the reflective pattern (not shown).

The foam layer 1220 includes a mixture 1222 and a plurality of first air bubbles 1224 that are scattered in the mixture 1222. The air bubbles 1224 have different sizes from one another. In this exemplary embodiment, a first diameter d1 of the air bubbles 1224 is no more than about 50 μm. The mixture 1222 includes an antistatic agent and acrylic resin. The first air bubbles 1224 are formed by a foaming agent. The foaming agent is vaporized at a predetermined temperature to form the first air bubbles 1224. That is, the foam layer 1220 includes the antistatic agent, the acrylic resin and the foaming agent.

The light guiding plate 1200 includes the reflective pattern (not shown) from which the light is reflected. The reflected light is guided toward the light characteristics improving member 1300, and diffused by the diffusing agent. In addition, the diffused light is scattered by the first air bubbles 1224 in the foam layer 1220 of the light guiding plate 1200. That is, the light generated from the lamp unit 1100 is diffused by the diffusing agent of the light guiding layer 1210 of the light guiding plate 1200, and the diffused light is scattered by the first air bubbles 1224 of the foam layer 1220, thereby uniformizing a luminance of the light. In addition, the light guiding plate 1200 has the foam layer 1220, such that the luminance is not decreased, although an amount of the diffusing agent is decreased.

The sizes of the first air bubbles 1224 of the foam layer 1220 are optimized to reduce a thickness of the light guiding plate 1200. In this embodiment, the sizes of the first air bubbles 1224 are decreased, and the number of the first air bubbles 1224 is increased so that an amount of the light diffusion is increased, thereby uniformizing the luminance of the light. Therefore, the thickness of the light guiding plate 1200 having the foam layer 1220 is smaller than that of a light guiding plate without the foam layer.

The light characteristics improving member 1300 includes a diffusion sheet 1310, a prism sheet 1320 and a first adhesive layer 1330. The diffusion sheet 1310 includes a thermosetting resin layer 1312, a plurality of second air bubbles 1314 and a plurality of beads 1316. The third air bubbles 1314 and the beads 1316 are in the thermosetting resin layer 1312. The prism sheet 1320 includes a reflective polarizing sheet 1322, and a brightness enhancement sheet 1324 that is integrally formed with the reflective polarizing sheet 1322. The reflective polarizing sheet 1322 includes a first base film 1322a and a reflective polarizing film 1322b that is on the first base film 1322a. The brightness enhancement sheet 1324 includes a second base film 1324a and a plurality of prisms 1324b. Each of the prisms 1324b may have a rounded corner.

The first adhesive layer 1330 is interposed between the diffusion sheet 1310 and the prism sheet 1320, such that the prism sheet 1320 is laminated on an upper surface of the diffusion sheet 1310. The first adhesive layer 1330 includes a first adhesive agent 1332 and a plurality of third air bubbles 1334 that are randomly distributed in the first adhesive agent 1332.

Referring again to FIGS. 11 and 12, a second adhesive layer 1250 is interposed between the light characteristics improving member 1300 and the light guiding plate 1200, such that the light characteristics improving member 1300 is laminated on an upper surface of the light guiding plate 1200. The second adhesive layer 1250 includes a second adhesive agent 1252 and a plurality of fourth air bubbles 1254 that are randomly distributed in the second adhesive agent 1252. The fourth air bubbles 1254 are formed by a foaming agent. The light characteristics improving member 1300 is integrally formed with the light guiding plate 1200 by the second adhesive agent 1252. In addition, the light that has passed through the light characteristics improving member 1300 is scattered by the fourth air bubbles 1254 to uniformize luminance of the light. Therefore, an additional diffusion sheet may be omitted.

A refractive index between the light guiding plate 1200 and the light characteristics improving member 1300 that is integrally formed with the light guiding plate 1200 is substantially 1. That is, the foam layer 1220 has the first air bubbles 1224, and the second adhesive layer 1250 has the fourth air bubbles 1254, such that the refractive index between the light guiding plate 1200 and the light characteristics improving member 1300 is substantially 1, although the light guiding plate 1200 is integrally formed with the light characteristics improving member 1300 without an additional air layer (not shown).

In addition, the diffusion sheet 1310 has the second air bubbles 1314, and the first adhesive layer 1330 has the third air bubbles 1334, such that the refractive index between the diffusion sheet 1310 and the prism sheet 1320 is substantially 1. Therefore, the refractive index between the light guiding plate 1200 and the light characteristics improving member 1300 is substantially 1, and the refractive index between the diffusion sheet 1310 and the prism sheet 1320 is substantially 1, such that a luminance of the backlight assembly is increased.

Referring again to FIGS. 11 and 12, the reflecting plate 1400 is under the light guiding plate 1200, and the light exiting a lower surface of the light guiding plate 1200 is reflected from the reflecting plate 1400 toward the light guiding plate 1200. The receiving container 1500 is arranged under the reflecting plate 1400, and has a bottom plate and a plurality of sidewalls that are protruded from sides of the bottom plate to form a receiving space. The light characteristics improving member 1300, the diffusion plate 1200 and the lamp unit 1100 are received in the receiving space.

Figure 13:
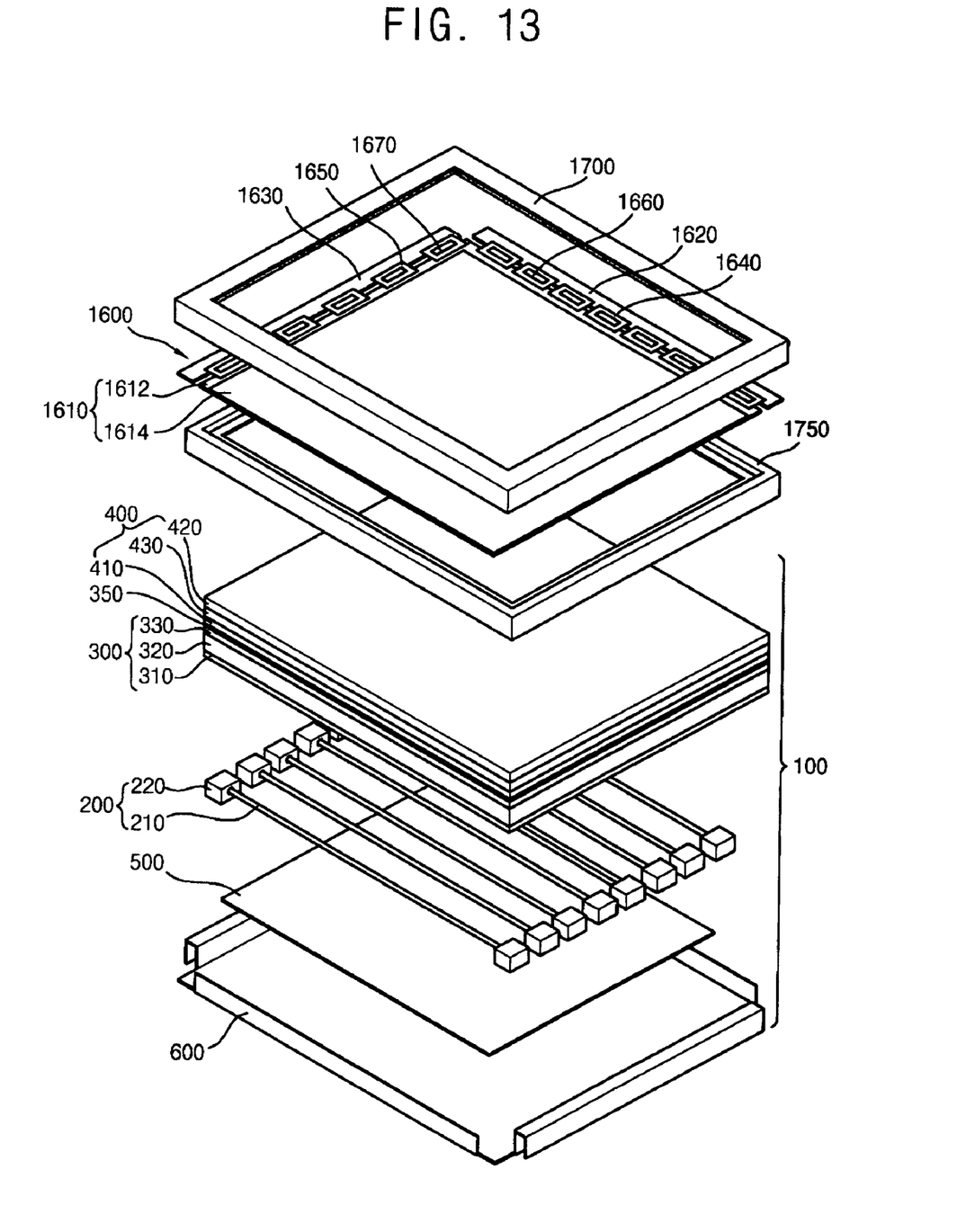
FIG. 13 is an exploded perspective view showing an LCD device in accordance with an embodiment of the present invention.

FIG. 13 is an exploded perspective view showing an LCD device in accordance with an embodiment of the present invention. A backlight assembly of FIG. 13 is same as in FIGS. 1, 2, 3, 5 and 7. Thus, the same reference numerals will be used to refer to the same or like parts as those described in FIGS. 1, 2, 3, 5 and 7 and any further explanation concerning the above elements will be omitted.

Referring to FIG. 13, the LCD device includes a backlight assembly 100, a display unit 1600 and a top chassis 1700. The backlight assembly 100 provides the display unit 1600 with light. The display unit 1600 displays an image using the light generated from the backlight assembly 100. The top chassis fixes the display unit 1600 to the backlight assembly 100. The backlight assembly 100 includes a lamp unit 200, a diffusion plate 300 and a light characteristics improving member 400. The lamp unit 200 generates light. The diffusion plate 300 is arranged on the lamp unit 200 to diffuse the light generated from the lamp unit 200. The light characteristics improving member 400 is integrally formed with the diffusion plate 300 to improve optical characteristics of the diffused light.

The backlight assembly 100 further includes a reflecting plate 500 and a receiving container 600. The reflecting plate 500 is under the lamp unit 200, such that a portion of the light generated from the lamp unit 200 is reflected from the reflecting plate 500. The receiving container 600 is under the reflecting plate 500 to receive the reflecting plate 500, the lamp unit 200, the diffusion plate 300 and the light characteristics improving member 400. The diffusion plate 300 includes a first foam layer 310, a diffusion layer 320 and a second foam layer 330. The light characteristics improving member 400 includes a diffusion sheet 410, a prism sheet 420 and a first adhesive layer 430. The diffusion sheet is integrally formed with the prism sheet 420 by the first adhesive layer 430. A second adhesive layer 350 is interposed between the diffusion plate 300 and the light characteristics improving member 400, such that light characteristics improving member 400 is integrally formed with the diffusion plate 300.

The first and second foam layers 310 and 330 and the diffusion sheet 410 have air bubbles. In addition, the first and second adhesive layers 430 and 350 also have air bubbles. Therefore, the luminance of the backlight assembly 100 is increased, although the light characteristics improving member 400 that has the diffusion sheet 410 and the prism sheet 420 integrally formed with the diffusion sheet 410, is integrally formed with the diffusion plate 300. In addition, a manufacturing process of the backlight assembly 100 is simplified. The display unit 1600 includes an LCD panel 1610, a source printed circuit board (PCB) 1620 and a gate PCB 1630. The LCD panel 1610 displays an image. The source and gate PCBs 1620 and 1630 apply driving signals to the LCD panel 1610.

In this embodiment, the source and gate PCBs 1620 and 1630 apply driving signals to the LCD panel 1610 through a data flexible circuit film 1640 and a gate flexible circuit film 1650, respectively. Each of the data and gate flexible circuit films 1640 and 1650 is a tape carrier package (TCP), a chip on film (COF), etc. The data and gate flexible circuit films 1640 and 1650 include a data driving chip 1660 and a gate driving chip 1670, respectively.

The LCD panel 1610 includes a thin film transistor (TFT) substrate 1612, a color filter substrate 1614 and a liquid crystal (not shown). The color filter substrate 1614 corresponds to the TFT substrate 1612. The liquid crystal (not shown) is interposed between the TFT substrate 1612 and the color filter substrate 1614.

The TFT substrate 1612 includes a glass substrate and a plurality of TFTs (not shown) that are arranged in a matrix shape on the glass substrate. A source electrode of each of the TFTs (not shown) is electrically connected to a data line (not shown). A gate electrode of each of the TFTs (not shown) is electrically connected to a gate line (not shown). A drain electrode of each of the TFTs (not shown) is electrically connected to a pixel electrode (not shown) that includes a transparent conductive material.

The color filter substrate 1614 is spaced apart from the TFT substrate 1612. The color filter substrate 1614 includes a red (R) color filter (not shown), a green (G) color filter (not shown), a blue (B) color filter (not shown) and a common electrode (not shown) that includes a transparent conductive material. The common electrode (not shown) is formed on the RGB color filters (not shown).

When a voltage is applied to the gate electrode (not shown) of each of the TFTs, the TFT is turned on so that an electric field is formed between the pixel electrode (not shown) and the common electrode (not shown). An arrangement of the liquid crystal (not shown) varies in response to the electric field applied thereto, such that a light transmittance of the liquid crystal (not shown) is changed, thereby displaying an image.

The source PCB 1620 is electrically connected to an end portion of the TFT substrate 1612 through the data flexible circuit film 1640. The gate PCB 1630 is electrically connected to another end portion of the TFT substrate 1612 through the gate flexible circuit film 1650. The driving signals include a data driving signal and a gate driving signal. The source PCB 1620 applies the data driving signal to the TFT substrate 1612. The gate PCB 1630 applies the gate driving signal to the TFT substrate 1612.

The data driving signal is applied to the data line of the TFT substrate 1612 through the data flexible circuit film 1640. The gate driving signal is applied to the gate line of the TFT substrate 1612 through the gate flexible circuit film 1650. An additional line may electrically connect the data flexible circuit film 1640 to the gate flexible circuit film 1650.

The display unit 1600 is on the backlight assembly 100. In this exemplary embodiment, an upper mold frame 1750 is interposed between the LCD panel 1610 and the backlight assembly 100. The data flexible circuit film 1640 is bent toward a rear surface of the receiving container 600 so that the source PCB 1620 is fixed to the rear surface of the receiving container 600. The top chassis 1700 surrounds a peripheral portion of the LCD panel 1610 that is received on the backlight assembly 100, and is combined with the receiving container 600. The top chassis 1700 protects the LCD panel 1610 from an externally provided impact, and prevents a drifting of the LCD panel 1610.

Figure 14:
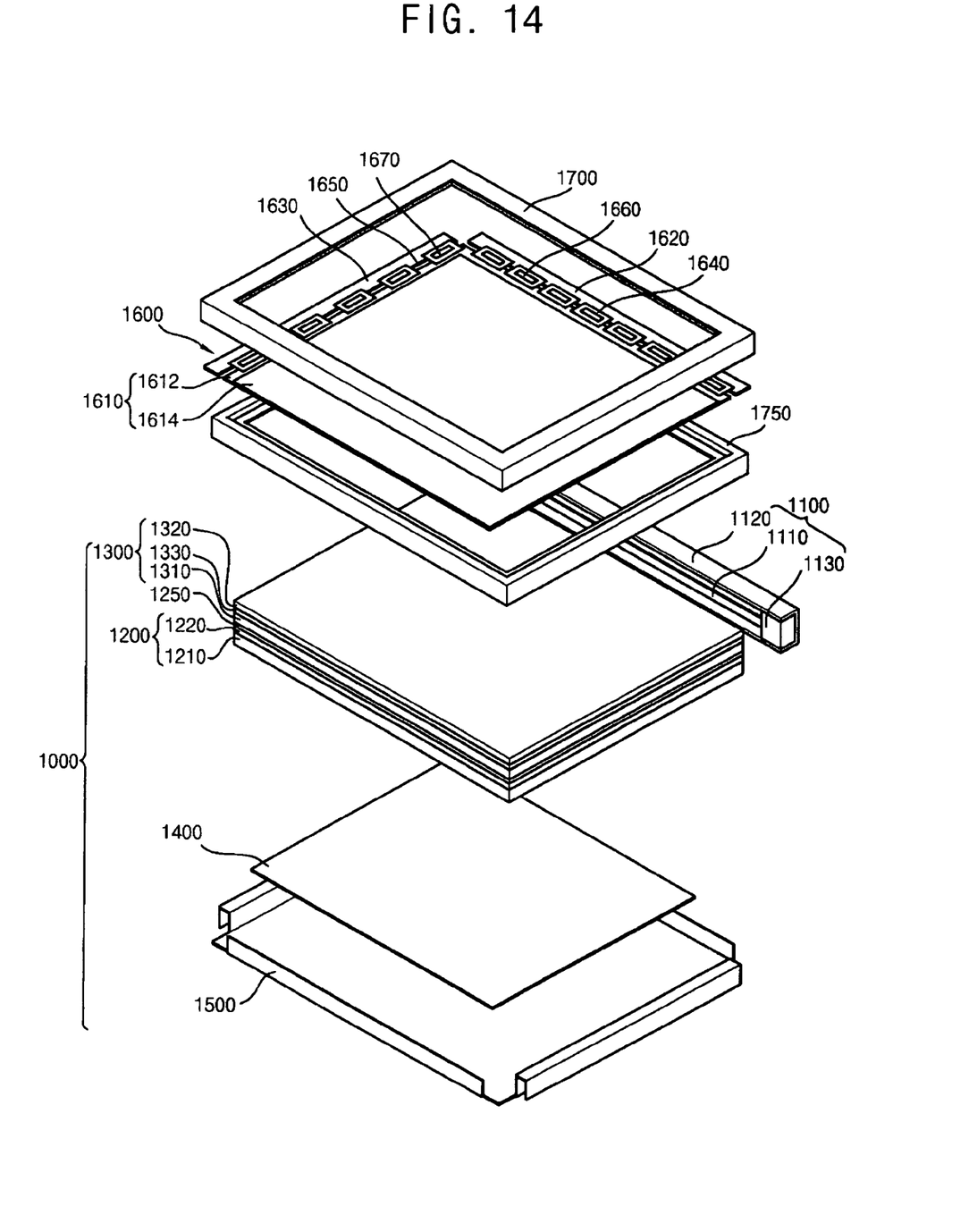
FIG. 14 is an exploded perspective view showing an LCD device in accordance with an embodiment of the present invention.

FIG. 14 is an exploded perspective view showing an LCD device in accordance with another exemplary embodiment of the present invention. A backlight assembly of FIG. 14 is same as in FIGS. 11 and 12. Thus, the same reference numerals will be used to refer to the same or like parts as those described in FIGS. 11 and 12 and any further explanation concerning the above elements will be omitted. Referring to FIG. 14, the LCD device includes a backlight assembly 1000, a display unit 1600 and a top chassis 1700. The backlight assembly 1000 provides the display unit 1600 with light. The display unit 1600 displays an image using the light generated from the backlight assembly 1000. The top chassis fixes the display unit 1600 to the backlight assembly 1000.

The backlight assembly 1000 includes a lamp unit 1100, a light guiding plate 1200 and a light characteristics improving member 1300. The lamp unit 1100 generates light. The light guiding plate 1200 is adjacent to the lamp unit 1100 to guide the light generated from the lamp unit 1100 toward the light characteristics improving member 1300. The light characteristics improving member 1300 is integrally formed with the light guiding plate 1200 to improve optical characteristics of the guided light.

The backlight assembly 1000 further includes a reflecting plate 1400 and a receiving container 1500. The reflecting plate 1400 is under the lamp unit 1100, such that a portion of the light generated from the lamp unit 1100 is reflected from the reflecting plate 1400. The receiving container 1500 is under the reflecting plate 1400 to receive the reflecting plate 1400, the lamp unit 1100, the light guiding plate 1200 and the light characteristics improving member 1300. In this exemplary embodiment, the lamp unit 1100 is adjacent to a side of the light guiding plate 1200.

The light guiding plate 1200 includes a light guiding layer 1210 and a foam layer 1220. The light characteristics improving member 1300 includes a diffusion sheet 1310, a prism sheet 1320 and a first adhesive layer 1330. The diffusion sheet 1310 is integrally formed with the prism sheet 1320 by the first adhesive layer 1330. A second adhesive layer 1250 is interposed between the light guiding plate 1200 and the light characteristics improving member 1300, such that light characteristics improving member 1300 is integrally formed with the light guiding plate 1200.

The foam layer 1220 and the diffusion sheet 1310 have air bubbles. In addition, the first and second adhesive layers 1330 and 1250 also have air bubbles. Therefore, the luminance of the backlight assembly 1000 is increased, although the light characteristics improving member 1300 that has the diffusion sheet 1310, and the prism sheet 1320 integrally formed with the diffusion sheet 1310, is integrally formed with the light guiding plate 1200. In addition, a manufacturing process of the backlight assembly 1000 is simplified.

The display unit 1600 of FIG. 14 is the same as in FIG. 13. Thus, the same reference numerals will be used to refer to the same or like parts as those described in FIG. 13 and any further explanation concerning the above elements will be omitted. Alternatively, a display device such as an organic light emitting display (OLED) device, a plasma panel display (PDP) device, etc., may have the diffusion plate and/or the light guiding plate.

According to the present invention, the light characteristics improving member is integrally formed with the diffusion plate that diffuses the light or the light guiding plate that guides the light into a predetermined direction. The diffusion plate and/or the light guiding plate include the foam layer having the air bubbles. In addition, the light characteristics improving member includes a diffusion sheet having the air bubbles and the prism sheet that is integrally formed with the diffusion sheet. Further, the adhesive layers interposed between the diffusion plate and the light characteristics improving member, between the light guiding plate and the light characteristics improving member, and between the diffusion sheet and the prism sheet have the air bubbles.

Therefore, the light characteristics improving member is integrally formed with the diffusion plate or the light guiding plate, and the diffusion sheet is integrally formed with the prism sheet so that an impact resistance of the light modulating plate is improved. In addition, the backlight assembly is easily fabricated.

The air bubbles are interposed between the light characteristics improving member and the diffusion plate or between the light characteristics improving member and the light guiding plate, such that the refractive index between the light characteristics improving member and the diffusion plate or between the light characteristics improving member and the light guiding plate is substantially one. Therefore, the luminance of the light is increased.

In addition, the air bubbles are interposed between the diffusion sheet and the prism sheet, such that the refractive index between the diffusion sheet and the prism sheet is substantially one, thereby increasing the luminance. Furthermore, the light is scattered by the air bubbles such that the amount of the diffusing agent is decreased, thereby decreasing the manufacturing cost of the backlight assembly.

This invention has been described with reference to the exemplary embodiments. It is evident, however, that many alternative modifications and variations will be apparent to those having skill in the art in light of the foregoing description. Accordingly, the present invention embraces all such alternative modifications and variations as they fall within the spirit and scope of the appended claims.

What is claimed is:

1. A light modulating plate, comprising:
   a light modulating layer, including a foam layer; and
   a light characteristics improving member integrally formed with the light modulating layer, wherein the light modulating layer comprises:
   a first foam layer having a plurality of first air bubbles to scatter an externally provided light;
   a diffusion layer formed on the first foam layer to diffuse the scattered light, the diffusion layer being substantially free of air bubbles;
   a second foam layer formed on the diffusion layer and having a plurality of second air bubbles, the second foam layer scattering the diffused light; and
   an adhesive layer formed between the light modulating layer and the light characteristics improving member to integrally combine the light modulating layer and the light characteristics improving member, the adhesive layer including an adhesive agent and air bubbles in the adhesive agent scattering the light scattered by the second foam layer, the air bubbles of the adhesive layer having a diameter smaller than that of the plurality of first air bubbles or the plurality of second air bubbles.

2. The light modulating plate of claim 1, wherein a diameter of the first and second air bubbles is no more than about 50 μm.

3. The light modulating plate of claim 1, wherein each of the first and second foam layers comprises acrylic resin, an antistatic agent and a foaming agent.

4. The light modulating plate of claim 1, wherein the light modulating layer further comprises a light guiding layer that guides an externally provided light, and the foam layer on the light guiding layer has a plurality of air bubbles to scatter the guided light.

5. The light modulating plate of claim 1, wherein the light characteristics improving member comprises:
   a diffusion sheet formed on the light modulating layer to diffuse the light that has passed through the light modulating layer; and
   an optical sheet integrally formed with the diffusion sheet to improve the optical characteristics of the diffused light.

6. The light modulating plate of claim 5, wherein the diffusion sheet comprises:
   a thermosetting resin layer; and
   a plurality of beads arranged in the thermo setting resin layer.

7. The light modulating plate of claim 5, wherein the diffusion sheet comprises:
   thermosetting resin layer having a plurality of air bubbles scattered at an upper portion thereof and
   a plurality of beads at a lower portion of the thermosetting resin layer.

8. The light modulating plate of claim 5, wherein the optical sheet comprises:
   a reflective polarizing sheet reflecting a portion of the light that has passed through the light diffusion layer and polarizing a remaining portion of the light that has passed through the light diffusion layer; and
   a prism sheet integrally formed with the reflective polarizing sheet.

9. The light modulating plate of claim 8, wherein the prism sheet comprises:
   a base film; and
   a plurality of prisms adjacent to each other on the base film, each of the prisms having a rounded corner.

10. The light modulating plate of claim 5, wherein the light characteristics improving member further comprises an adhesive layer formed between the diffusion sheet and the optical sheet.

11. The light modulating plate of claim 10, wherein the adhesive layer comprises an adhesive agent and a plurality of air bubbles scattered in the adhesive agent.

12. A backlight assembly, comprising:
a lamp generating light;
a light modulating layer, including a foam layer; and
a light characteristics improving member integrally formed with the light modulating layer, wherein the light modulating layer comprises:
a first foam layer having a plurality of first air bubbles to scatter the light;
a diffusion layer formed on the first foam layer to diffuse the scattered light, the diffusion layer being substantially free of air bubbles;
a second foam layer formed on the diffusion layer and having a plurality of second air bubbles to scatter the diffused light; and
an adhesive layer formed between the light modulating layer and the light characteristics improving member to integrally combine the light modulating layer and the light characteristics improving member, the adhesive layer including an adhesive agent and air bubbles in the adhesive agent scattering the light scattered by the second foam layer, the air bubbles of the adhesive layer having a diameter smaller than that of the plurality of first air bubbles or the plurality of second air bubbles.

13. The backlight assembly of claim 12, wherein the light modulating layer further comprises a light guiding layer formed on the lamp, and the foam layer on the light guiding layer has a plurality of air bubbles.

14. The backlight assembly of claim 12, further comprising an adhesive member formed between the light modulating layer and the light characteristics improving member.

15. The backlight assembly of claim 14, wherein the adhesive member comprises an adhesive agent and a plurality of air bubbles scattered in the adhesive agent.

16. A backlight assembly, comprising:
a lamp generating light;
a first foam layer scattering the light generated from the lamp and having a plurality of first air bubbles;
a diffusion layer integrally formed with the first foam layer to diffuse the firstly scattered light, the diffusion layer being substantially free of air bubbles;
a second foam layer integrally formed with the diffusion layer to scatter the diffused light and having a plurality of second air bubbles; and
a light characteristics improving layer integrally formed with the second foam layer by an adhesive layer, wherein the adhesive layer includes an adhesive agent and a plurality of air bubbles scattering the scattered light by the foam layer,
wherein the air bubbles of the adhesive layer have a diameter smaller than that of the first air bubbles or the second air bubbles.

17. The backlight assembly of claim 16, wherein the first foam layer comprises a plurality of first air bubbles, and the second foam layers comprises a plurality of second air bubbles.

18. display device, comprising:
a display unit that displays an image; and
a backlight assembly including:
a lamp generating light;
a light modulating layer having a foam layer to scatter the light generated from the lamp; and a light characteristics improving member integrally formed with the light modulating layer, wherein the light modulating layer comprises:
a first foam layer having a plurality of first air bubbles to scatter the light;
a diffusion layer formed on the first foam layer to diffuse the scattered light, the diffusion layer being substantially free of air bubbles;
a second foam layer formed on the diffusion layer and having a plurality of second air bubbles to scatter the diffused light; and
an adhesive member interposed between the light modulating layer and the light characteristics improving member, the adhesive member including an adhesive agent and a plurality of third air bubbles in the adhesive agent scattering the scattered light by the second foam layer,
wherein the third air bubbles have a diameter smaller than that of the first air bubbles or the second air bubbles.

* * * * *